United States Patent
Felderman et al.

(10) Patent No.: US 11,146,614 B2
(45) Date of Patent: *Oct. 12, 2021

(54) DISTRIBUTED COMPUTING ON DOCUMENT FORMATS

(71) Applicant: International Business Machines Corporation, Armonk, NY (US)

(72) Inventors: Gregory S. Felderman, Broomfield, CO (US); Brian K. Hoyt, Thornton, CO (US)

(73) Assignee: International Business Machines Corporation, Armonk, NY (US)

( * ) Notice: Subject to any disclaimer, the term of this patent is extended or adjusted under 35 U.S.C. 154(b) by 109 days.

This patent is subject to a terminal disclaimer.

(21) Appl. No.: 15/831,869

(22) Filed: Dec. 5, 2017

(65) Prior Publication Data

US 2018/0095939 A1    Apr. 5, 2018

Related U.S. Application Data

(63) Continuation of application No. 15/223,293, filed on Jul. 29, 2016.

(51) Int. Cl.
| | |
|---|---|
| *G06F 16/00* | (2019.01) |
| *H04L 29/08* | (2006.01) |
| *H04L 29/06* | (2006.01) |
| *G06F 40/131* | (2020.01) |

(52) U.S. Cl.
CPC ............ *H04L 67/02* (2013.01); *G06F 40/131* (2020.01); *H04L 67/42* (2013.01); *H04L 67/10* (2013.01)

(58) Field of Classification Search
CPC ......... G06F 17/30115; G06F 17/30253; G06F 17/2229; G06F 3/0601; G06F 3/0602; G06F 3/0603; G06F 3/0614; G06F 40/131; G04L 67/02; H04L 67/02; H04L 67/10

See application file for complete search history.

(56) References Cited

U.S. PATENT DOCUMENTS

| | | | |
|---|---|---|---|
| 8,099,397 B2 | 1/2012 | Felderman et al. | |
| 8,543,596 B1 | 9/2013 | Kostamaa et al. | |
| 8,659,777 B2 * | 2/2014 | Yokokura | G06F 3/121 358/1.15 |

(Continued)

OTHER PUBLICATIONS

Ramya et al.; Distributed Pattern Matching Ad Document Analysis In Big Data Using Hadoop MapReduce Model, PDGC IEEE Inter. Conf. On, Dec. 11-13, 2014, pp. 312-317.

(Continued)

*Primary Examiner* — Cesar B Paula
*Assistant Examiner* — Carl E Barnes, Jr.
(74) *Attorney, Agent, or Firm* — Farrokh Pourmirzaie; SVL IPLaw Edell, Shapiro & Finnan, LLC

(57) ABSTRACT

According to one embodiment of the present invention, a system includes at least one processor. The system partitions a document into a plurality of data blocks, wherein each data block comprises one or more complete logical units of the document. A plurality of sub-documents is produced from the plurality of data blocks. The sub-documents are processed in parallel by a plurality of processing elements. Embodiments of the present invention further include a method and computer program product for processing a document in parallel in substantially the same manner described above.

7 Claims, 11 Drawing Sheets

(56) References Cited

U.S. PATENT DOCUMENTS

| | | | |
|---|---|---|---|
| 9,015,197 B2 | 4/2015 | Richards et al. | |
| 2009/0228528 A1 | 9/2009 | Ercegovac et al. | |
| 2010/0122065 A1* | 5/2010 | Dean | G06F 17/30445 712/203 |
| 2011/0055162 A1* | 3/2011 | Felderman | G06F 17/2205 707/667 |
| 2011/0153604 A1* | 6/2011 | Yu | G06F 17/2247 707/737 |
| 2012/0079364 A1* | 3/2012 | Agarwal | G06F 40/131 715/234 |
| 2012/0182891 A1 | 7/2012 | Lee et al. | |
| 2014/0067792 A1 | 3/2014 | Erdogan et al. | |
| 2014/0215178 A1* | 7/2014 | Li | G06F 9/5066 711/173 |
| 2014/0215487 A1 | 7/2014 | Cherkasova et al. | |
| 2014/0282563 A1 | 9/2014 | Jacobson et al. | |
| 2015/0067003 A1* | 3/2015 | MacLeod | G06F 17/30115 707/827 |
| 2015/0067004 A1* | 3/2015 | Shvachko | G06F 16/182 707/827 |
| 2015/0125133 A1 | 5/2015 | Kim et al. | |
| 2015/0220529 A1* | 8/2015 | Eltabakh | G06F 16/182 707/719 |
| 2015/0254287 A1* | 9/2015 | Tateiwa | G06F 16/9574 707/755 |
| 2015/0324242 A1 | 11/2015 | Yu et al. | |
| 2015/0379024 A1 | 12/2015 | Ge et al. | |
| 2016/0078052 A1 | 3/2016 | Srivas et al. | |
| 2016/0085731 A1 | 3/2016 | Bruno et al. | |
| 2016/0094480 A1 | 3/2016 | Kulkarni et al. | |
| 2018/0032478 A1 | 2/2018 | Felderman et al. | |
| 2018/0196828 A1* | 7/2018 | Eltabakh | G06F 16/182 |

OTHER PUBLICATIONS

Kim et al.; "Data Block Management Scheme Based On Secret Sharing For HDFS", BWCCA IEEE 10th International Conference On, Nov. 4-6, 2015, pp. 51-56.

"MapReduce", Wikipedia, the free encyclopedia, https://en.wikipedia.org/wiki/MapReduce , retreived from internet: Jul. 14, 2016, 11 pages.

Hurwitz et al., "Hadoop MapReduce for Big Data", For Dummies, http://www.dummies.com/how-to/content/hadoop-mapreduce-for-big-data.html, retrieved from internet: Jul. 14, 2016, 4 pages.

"HDFS Architecture", The Apache Software Foundation, https://hadoop.apache.org/docs/current/hadoop-project-dist/hadoop-hdfs/HdfsDesign.html, retrieved from Internet: Jul. 14, 2016, pp. 2-3.

"Apache Hadoop", https://en.wikipedia.org/wiki/Apache_Hadoop, retrieved from Internet Jul. 14, 2016, 15 pages.

Hanson, "An introduction to Hadoop Distributed File System" IBM DeveloperWorks, http://www.ibm.com/developerworks/library/wa-introhdfs/, retrieved from internet Jul. 14, 2016, 8 pages.

List of IBM Patents or Patent Applications Treated as Related, Dec. 2017, 1 page.

\* cited by examiner

DISTRIBUTED COMPUTING ON DOCUMENT FORMATS

CROSS-REFERENCE TO RELATED APPLICATIONS

This application is a continuation of U.S. patent application Ser. No. 15/223,293, entitled "DISTRIBUTED COMPUTING ON DOCUMENT FORMATS" and filed Jul. 29, 2016, the disclosure of which is incorporated herein by reference in its entirety.

BACKGROUND

Technical Field

Present invention embodiments relate to distributed computing, and more specifically, to partitioning a document (e.g., with a document format incompatible with size boundaries, etc.) enabling parallel processing of the document by a distributed computing environment.

Discussion of the Related Art

The introduction of map/reduce computing and the HADOOP platform has created an environment where massive amounts of very large files can be efficiently stored and processed on commodity hardware in a short period of time. Files in the HADOOP File System (HDFS) are decomposed into smaller blocks (64 Megabytes by default), where each block can be stored on one or more storage nodes of the HADOOP platform. When a document is processed, the map/reduce algorithm is most efficient when each block of data can be processed individually, or at least be split into smaller logical units. Common processing includes analytics and full text search. A key requirement for this approach to work efficiently is that the files can be decomposed into smaller objects (or splits) to enable multiple computing nodes to be leveraged to process the work load. This approach works well when the files are text and/or records based since each split can be worked on independently. However, when certain other types of files are introduced (e.g., PDF, AFP, LINE, WORD, etc.), the individual blocks representing the file must be combined before further processing can occur, and the file can only be processed by one map task or computing node.

SUMMARY

According to one embodiment of the present invention, a system includes at least one processor. The system partitions a document into a plurality of data blocks, wherein each data block comprises one or more complete logical units of the document. A plurality of sub-documents is produced from the plurality of data blocks. The sub-documents are processed in parallel by a plurality of processing elements. Embodiments of the present invention further include a method and computer program product for processing a document in parallel in substantially the same manner described above.

BRIEF DESCRIPTION OF THE DRAWINGS

Generally, like reference numerals in the various figures are utilized to designate like components.

DETAILED DESCRIPTION

Present invention embodiments enable parallel processing (e.g., via a map/reduce framework) of large files. In conventional implementations, each of the stored data blocks of a large file are transferred to a single node, combined, and subsequently processed. This could require numerous data transfers over a network, and large amounts of physical memory to host the large file. However, present invention embodiments transform each stored data block of file data into a stand-alone document (or sub-document) in the format of the original file. Each stand-alone document (or sub-document) is assigned to a different parallel task or node (e.g., a map task), thereby enabling parallel processing of the original file.

Figure 1A:
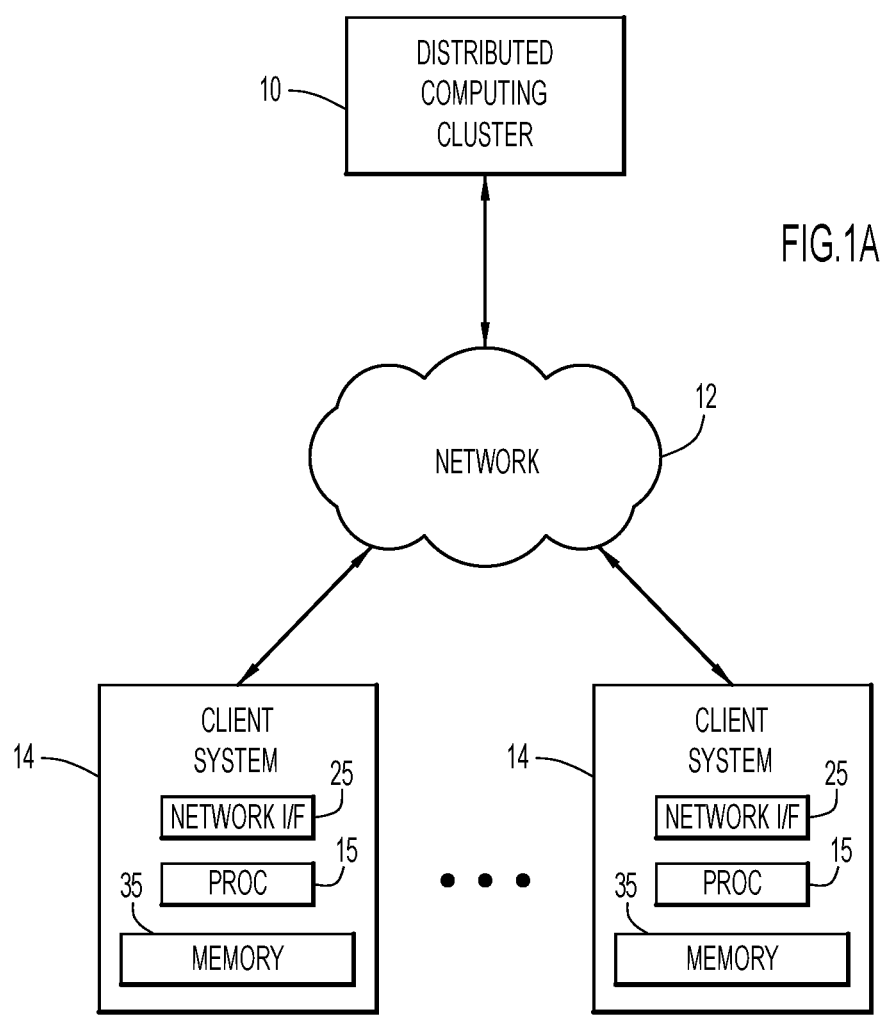
FIG. 1A is a diagrammatic illustration of an example computing environment for use with an embodiment of the present invention.

An example computing environment for use with present invention embodiments is illustrated in FIG. 1A. Specifically, the computing environment includes a distributed computing cluster 10, and one or more client or end-user systems 14. Distributed computing cluster 10 and client systems 14 may be remote from each other and communicate over a network 12. The network may be implemented by any number of any suitable communications media (e.g., wide area network (WAN), local area network (LAN), Internet, Intranet, etc.). Alternatively, distributed computing cluster 10 and client systems 14 may be local to each other, and communicate via any appropriate local communication medium (e.g., local area network (LAN), hardwire, wireless link, Intranet, etc.).

Client systems 14 enable users to submit processing requests to distributed computing cluster 10 to determine various information (e.g., analytics and full text search of documents, etc.). The client systems may present a graphical user (e.g., GUI, etc.) or other interface (e.g., command line prompts, menu screens, etc.) to solicit information from users pertaining to the desired processing requests, documents, and/or analysis, and may provide reports including results of the processing requests (e.g., analytics, text searching, etc.).

Client systems 14 may be implemented by any conventional or other computer systems preferably equipped with a display or monitor, a base (e.g., including at least one processor 15, one or more memories 35 and/or internal or external network interfaces or communications devices 25 (e.g., modem, network cards, etc.)), optional input devices (e.g., a keyboard, mouse or other input device), and any commercially available and custom software (e.g., browser/interface software, one or more applications providing requests for the distributed computing cluster, etc.).

Figure 1B:
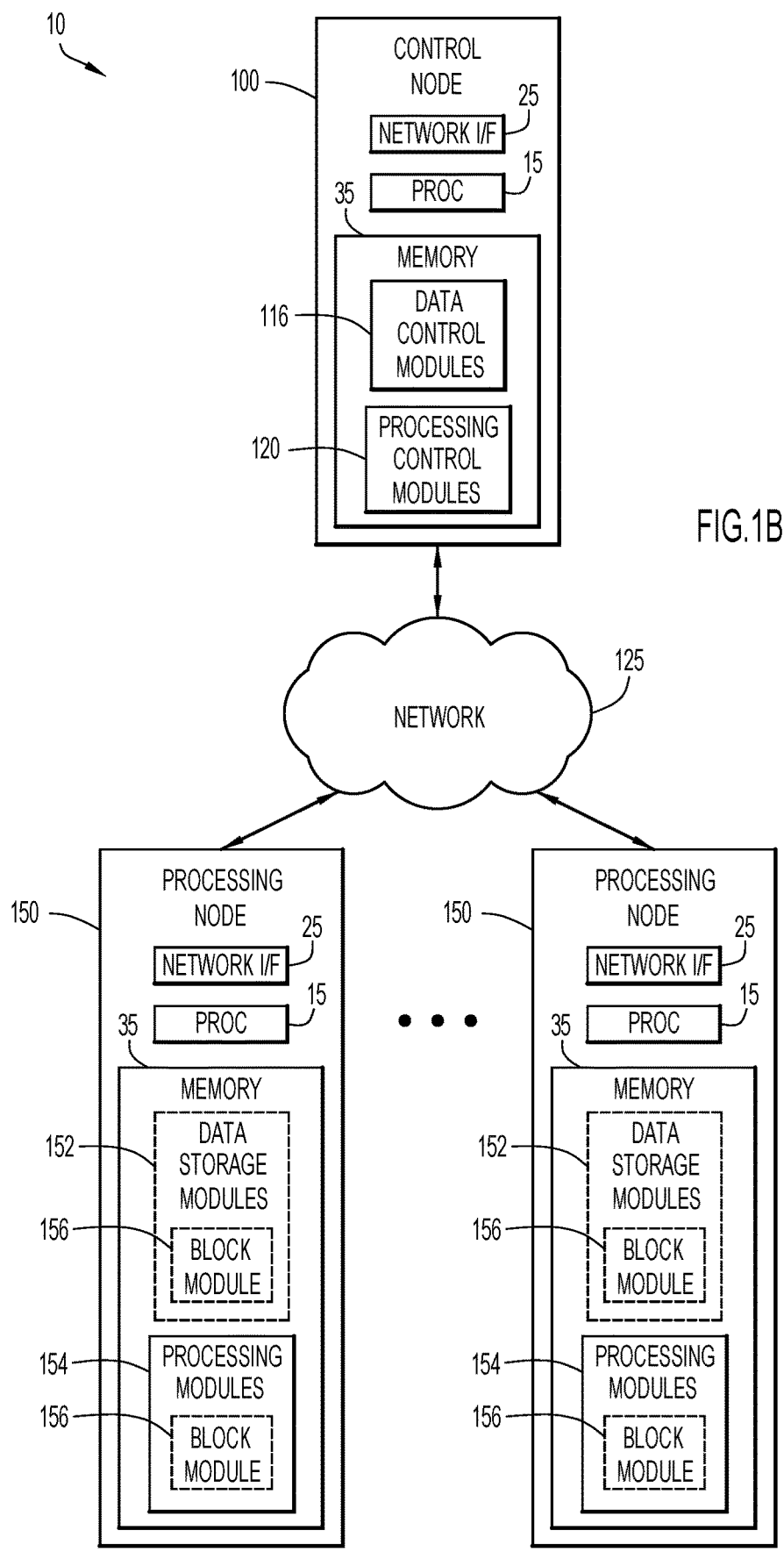
FIG. 1B is a diagrammatic illustration of an example distributed computing cluster of the environment of FIG. 1A.

Referring to FIG. 1B, distributed computing cluster 10 includes a control node 100, and one or more processing nodes 150. Control node 100 controls processing nodes 150 to perform data storage and computing operations to process requests from client systems 14. Control node 100 and processing nodes 150 may be remote from each other and communicate over a network 125. The network may be implemented by any number of any suitable communications media (e.g., wide area network (WAN), local area network (LAN), Internet, Intranet, etc.), and may be the same or different network than network 12 (FIG. 1A). Alternatively, control node 100 and processing nodes 150 may be local to each other, and communicate via any appropriate local communication medium (e.g., local area network (LAN), hardwire, wireless link, Intranet, etc.).

Distributed computing cluster 10 preferably implements a distributed file system and a map/reduce framework. However, the distributed computing cluster may include any file system and implement any suitable framework for distributed or parallel processing.

The map/reduce framework processes large data sets in parallel, and employs a map function on processing nodes (e.g., on processing nodes 150) to process, in parallel based on a corresponding key value, input data initially assigned to the processing nodes. Data is re-distributed among the processing nodes based on output keys of the map function, where data common to an output key is assigned to a same processing node for further processing. A reduce function on the processing nodes processes the assigned output data from the map function in parallel based on the output keys, where the output of these reduce functions is collected and organized by the output key to provide the resulting output.

For example, a map/reduce framework may be employed to determine a count of words in a set of documents. Each document may be initially assigned to a corresponding processing node and map function. Each map function (in parallel) processes the assigned document from the set of documents and produces a list with entries including an output key value (e.g., the identified word, w) and a count value (e.g., of 1) (e.g., an entry may be represented as [word, 1]). The map/reduce framework groups entries from all of the resulting lists with the same key (e.g., each group pertains to the same word), and assigns each group to a corresponding processing node and reduce function. Each reduce function (in parallel) basically sums the word count values of entries in the assigned group to determine the total occurrences of the associated word in the set of documents.

Control node 100 includes data control modules 116 and processing control modules 120. Data control modules 116 control operations for the distributed file system implemented among processing nodes 150. The data control modules may manage a file system namespace (e.g., opening, closing and renaming files and directories, etc.), regulate access to files by client systems 14, and determine mappings of file data blocks to processing nodes 150 for storage of files.

Processing control modules 120 control processing of requests from client systems 14 within the distributed computing cluster (e.g., map/reduce framework). The processing control modules perform various operations, including managing job scheduling across nodes. For example, the processing control modules may provide work to processing nodes 150 in response to submission of jobs (e.g., map/reduce jobs) to the distributed computing cluster by clients. The requests, document data, and any other information may be stored within a memory of control node 100. The memory may be implemented by any conventional or other storage unit.

Each processing node 150 includes data storage modules 152 and processing modules 154. The data storage modules perform various operations for the distributed file system, including processing read and write requests for the distributed file system, and performing data block operations received from control node 100 (e.g., create, delete, and replicate data blocks, etc.). The intermediate results, document data, data blocks, and any other information may be stored within a memory of processing node 150. The memory may be implemented by any conventional or other storage unit.

Processing modules 154 perform the processing for jobs (e.g., map/reduce jobs for the map/reduce framework) assigned from control node 100. This processing may include dividing input into appropriate sized partitions or splits, assigning the partitions to parallel tasks (e.g., map tasks), shuffling the output of the parallel tasks (e.g., map tasks) among the processing nodes, and allocating the output to corresponding tasks (e.g., reduce tasks) to produce the output for the jobs.

Accordingly, data control modules 116 and data storage modules 152 may implement the functions of the distributed file system, while processing control modules 120 and processing modules 154 may implement the functions of the map/reduce or other distributed computing framework. By way of example, distributed computing cluster 10 may be implemented by a HADOOP platform with a HADOOP Distributed File System (HDFS). In this example case, data control modules 116 and data storage modules 152 implement the functions of the HADOOP Distributed File System (HDFS), while processing control modules 120 and processing modules 154 implement the functions of the HADOOP platform (e.g., including a Map/Reduce Engine for processing HADOOP Map/Reduce jobs).

Processing modules 154 of processing nodes 150 further include a block module 156. The block module receives blocks of data for a file stored in the distributed file system of processing nodes 150, and transforms each stored block of file data into a stand-alone document (or sub-document) in the format of the original file according to embodiments of the present invention. Each stand-alone document (or sub-document) is assigned to a different parallel task or processing node 150 (e.g., a map task), thereby enabling parallel processing of the original file. Block module 156 may further be included within data storage modules 152 of processing nodes 150 to intelligently partition a file for storage in the distributed file system for parallel processing as described below.

Control node 100 and processing nodes 150 may be implemented by any conventional or other computer systems (e.g., server computer systems, etc.), preferably equipped with a display or monitor, a base (e.g., including at least one processor 15, one or more memories 35 and/or internal or external network interfaces or communications devices 25 (e.g., modem, network cards, etc.)), optional input devices (e.g., a keyboard, mouse or other input device), and any commercially available and custom software (e.g., server/communications software, data control modules, processing control modules, data storage modules, processing modules, block module, etc.).

The modules (e.g., data control modules, processing control modules, data storage modules, processing modules, block module, etc.) may include one or more modules or units to perform the various functions of present invention embodiments described below. The various modules (e.g., data control modules, processing control modules, data storage modules, processing modules, block module, etc.) may be implemented by any combination of any quantity of software and/or hardware modules or units, and may reside within memory 35 of the control and/or processing nodes for execution by a corresponding processor 15.

Figure 2:
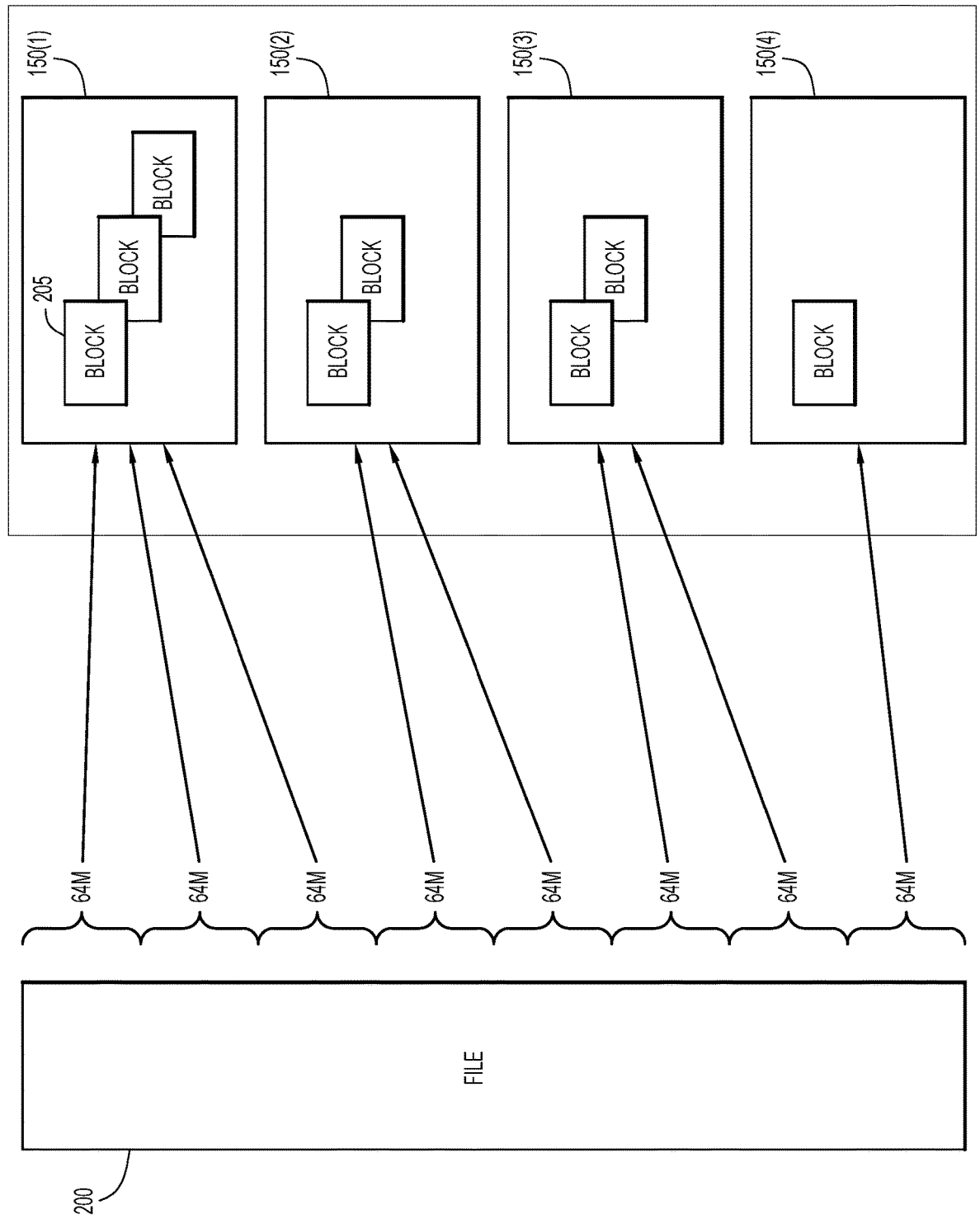
FIG. 2 is a diagrammatic illustration of storage of an example document among the processing nodes of the distributed computing cluster of FIG. 1B.

A manner of partitioning a file into data blocks for storage in the distributed file system among processing nodes 150 is illustrated, by way of example, in FIG. 2. Initially, a file or document 200 is partitioned into data blocks 205 based on a specific quantity of data (e.g., specific bit or byte boundary) (e.g., 64M or 64 Megabytes). For example, the file may be examined and each portion containing the specific quantity of data (e.g., 64M) is placed in a corresponding data block 205. The data blocks 205 are each assigned to and stored in a corresponding processing node 150. For example, file 200 may be partitioned into data blocks 205 each containing 64M of file data, where: processing node 150(1) may be assigned and store three data blocks 205; processing nodes 150(2) and 150(3) may each be assigned and store two data blocks 205; and processing node 150(4) may be assigned and store one data block 205 (as viewed in FIG. 2).

Figure 3:
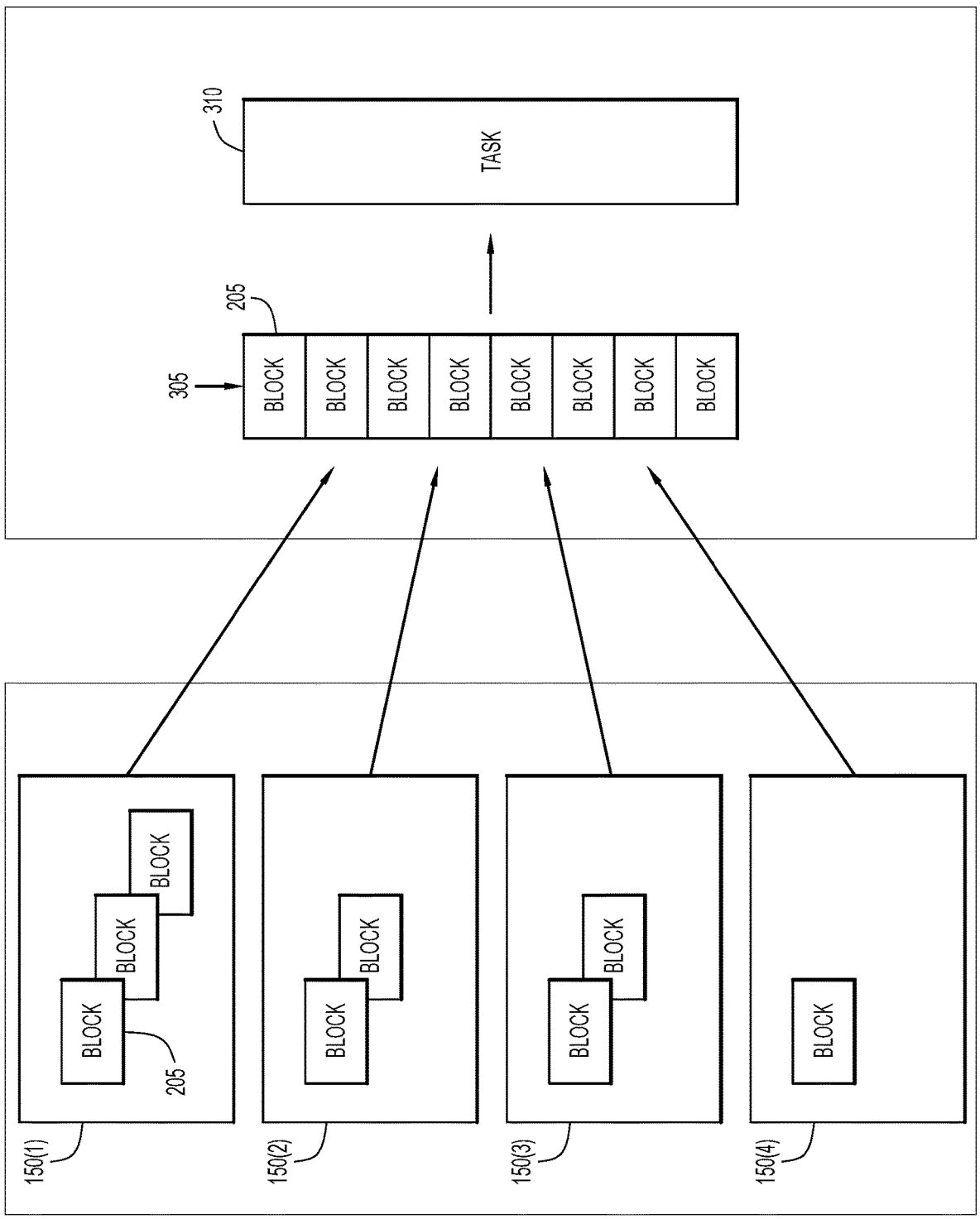
FIG. 3 is a diagrammatic illustration of assignment of an example document partitioned on byte boundaries to a single task.

When an operation or job (e.g., map/reduce job) is to be performed, the file is retrieved (e.g., the data blocks among the processing nodes are retrieved), and the data blocks 205 are assigned to parallel tasks as illustrated in FIG. 3. In the case of documents that can be partitioned at virtually any location (e.g., text or record based documents that can be partitioned on uniform or other size (e.g., bit or byte) boundaries), the data blocks may be assigned to different parallel tasks (e.g., map tasks) or processing nodes. However, for documents that have a specific structure or schema for document components (e.g., and cannot be efficiently partitioned on specific size (e.g., bit or byte) boundaries), the partitioning does not lend itself to parallelization. Rather, data blocks 205 are retrieved from processing nodes 150, and placed in a common group 305 to re-create (or represent) the entire document. The common group or entire document is assigned to a single task 310 or processing node. Thus, all the data blocks for the document are retrieved and assigned to a single node, where they are combined to re-create the document and assigned to a single task (e.g., map task) which creates one unit of processing. This provides for a single processing node 150 to process the entire document, thereby losing the advantages of parallel processing.

Figure 4:
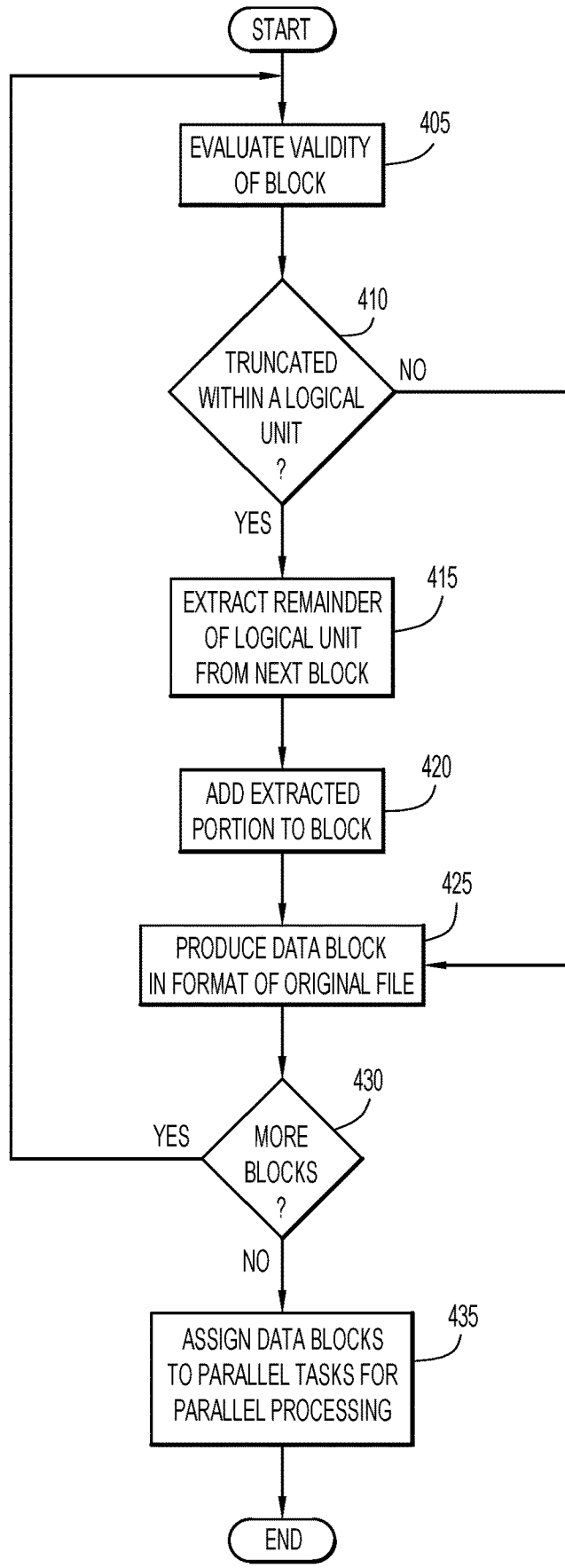
FIG. 4 is a procedural flowchart of a manner of partitioning an example document stored according to FIG. 2 for assignment to parallel tasks according to an embodiment of the present invention.

A manner of partitioning a file or document to enable parallel processing of the document according to an embodiment of the present invention embodiment (e.g., via processing module 154, block module 156, and a processing node 150) is illustrated in FIG. 4. Initially, a file or document with components of a specific structure (e.g., a file or document that cannot be efficiently partitioned on specific size (e.g., bit, byte, etc.) boundaries) is received and stored in the distributed file system of distributed computing cluster 10 as described above (FIG. 2). Examples of such files include: Portable Document Format (PDF), MICROSOFT WORD, LINE, Advanced Function Presentation (AFP), XML, HTML, etc.). Data blocks for the file are initially formed based on a specific quantity of data (e.g., size (e.g., bit or byte) boundary), and stored among processing nodes 150. For example, the data block size may be 64 Megabytes (e.g., 64M by default). Thus, a file of size 1 Gigabyte (1G) requires sixteen 64M data blocks.

An operation or job (e.g., map/reduce job) on the file is received (e.g., from a client system 14) for processing. The data blocks containing the file are initially retrieved from the distributed file system of processing nodes 150 for arrangement and assignment to parallel tasks (e.g., map tasks). A data block is initially examined to determined whether the data block has been partitioned on a desired logical boundary (e.g., a page, etc.) at step 405. This may be accomplished by comparing the data of the data block to information within a schema for the document. The schema may indicate the identifiers (e.g., headers, fields, indicators, etc.) within a document designating boundaries for logical units or sections (e.g., page, line, document component structures, etc.). For example, a schema for an Advanced Function Presentation (AFP) document may indicate the identifiers (e.g., headers, fields, indicators, etc.) for the logical units of a page (e.g., BPG and EPG fields, etc.) and/or line that may be used for the partitions. The document and corresponding schemas may relate to any desired documents to enable parallel processing of those documents (e.g., PDF, LINE, AFP, MS WORD, XML, HTML, etc.).

The data within the data block is compared to information within the schema for the document to identify boundaries for the various logical units (or sections) within the document, and determine whether a partition has occurred within a logical unit. If the data block has not been partitioned on the desired logical boundary (e.g., has been partitioned within a logical unit (e.g., the data block contains an incomplete logical unit where one or more remaining portions of the logical unit reside on other data blocks)), the remaining portion completing the logical unit is extracted from a succeeding data block stored among processing nodes 150 at step 415. The extracted portion is added to the end of the data block being processed at step 420 to complete the logical unit and enable the data block to be partitioned on a logical boundary (e.g., page, etc.).

However, the data may be shifted in any manner to either prior or succeeding data blocks to complete a logical unit (e.g., data from a succeeding data block may be appended to a prior data block to complete a logical unit as described above, data from a prior data block may be inserted into a succeeding data block to complete a logical unit, data block content may be shifted or adjusted in any manner, etc.). Moreover, data may be retrieved from any quantity of other (succeeding or preceding) data blocks to complete logical units.

Further, the quantity and size (or storage capacity) of the data blocks may vary based on the desired amount of parallel processing. For example, an optimal processing arrangement may include one data block for each processing node. In this case, the quantity of data blocks may be equal to the quantity of processing nodes, and the size of the data blocks may be equal to the size of the document divided by the quantity of processing nodes (e.g., data block size=(size of document/quantity of processing nodes)). By way of example, a distributed computing cluster of 10 nodes may employ ten data blocks each of 1 Megabyte for processing in parallel a 10 Megabyte document (e.g., block size of 1M=document size of 10M/10 processing nodes). However, the quantity and size of the data blocks may be any desired values suitable for a particular activity.

The shifting of data between the data blocks to complete a logical unit may exceed the data block size by a predetermined or threshold amount (e.g., a specific quantity, a percentage of the size of the data block, etc.) in order to complete a logical unit within a data block. Further, the data block size may be regulated, where data is shifted between data blocks in a manner enabling each data block to be within a predetermined or threshold amount (e.g., a specific quantity, a percentage of the size of the data block, etc.) of a specified data block size.

Once the data block is processed and partitioned on a logical boundary (e.g., either altered based on the above modification or was already residing in this state), the data block is written in the format of the original source file stored in the distributed file system at step 425 to produce a new stand-alone document (or sub-document) for assignment to parallel tasks.

The presence of additional data blocks for the file is determined at step 430, and the process is repeated for the remaining data blocks (e.g., including those that have been altered by shifting of data). For example, during the partitioning phase (e.g., dividing input into appropriate sized partitions or splits) for processing an operation or job (e.g., map/reduce job), first and second data blocks of a file are opened. A first logical unit (e.g., page, etc.) of the second data block was "chopped" during data block storage with portions of that logical unit extending from the end of the first data block into an initial portion of the second data block. The first logical unit of the second data block is moved to the end of the first data block to create a complete logical unit (e.g., page, etc.). The first data block is written in the format of the original source file stored in the distributed file system to produce a new stand-alone document (or sub-document). This new document is assigned to a first parallel task (e.g. a first map task).

The quantity of data blocks may vary in any manner based on the shifting of data to complete logical units. For example, the quantity of data blocks may increase (e.g., in case of a logical unit being stored in a new data block due to the shifting) or decrease (e.g., in case of an empty data block due to extraction of all data of that data block by the shifting)).

Once the data blocks have been processed, each data block is a stand-alone document (or sub-document) and assigned (e.g., by the map/reduce framework) for processing by a separate parallel task (e.g., map task) at step 435. Further, not all data blocks need to be retrieved and provided to a corresponding processing node. Each processing node already containing data blocks for the requested document can perform processing on the local data blocks with each processing node only having to retrieve additional data blocks most likely from one other processing node.

Figure 5:
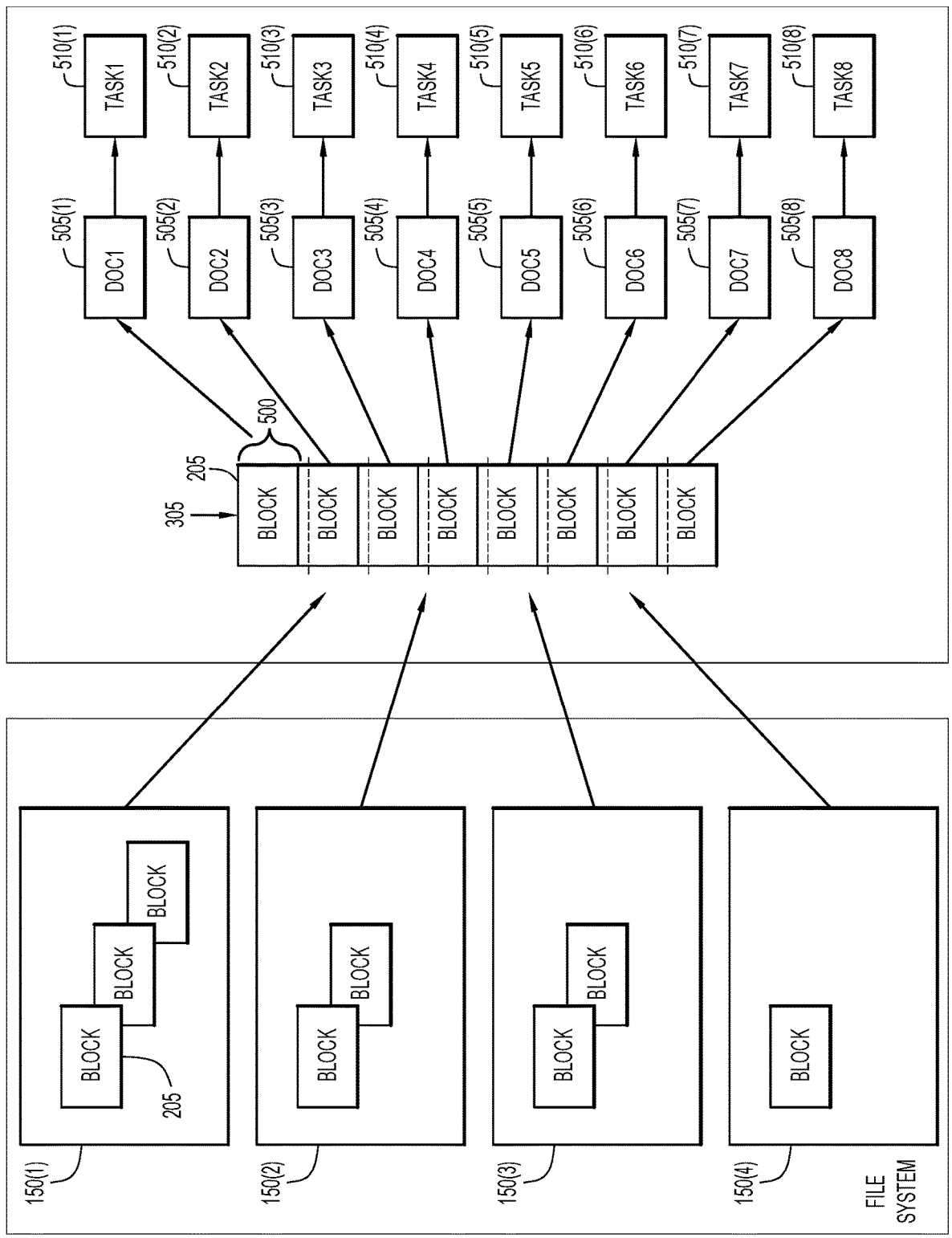
FIG. 5 is a diagrammatic illustration of partitioning an example document for assignment to parallel tasks according to an embodiment of the present invention.

An example of the approach of present invention embodiments applied to a document is illustrated in FIG. 5. By way of example, a file 200 (FIG. 2) may include a document in the Advanced Function Presentation (AFP) format with a desired logical unit of a page. A page is denoted in the AFP format by a begin page (BPG) structured field and an end page (EPG) structured field.

Initially, file 200 may be partitioned into data blocks 205 each containing 64M of file data as described above (FIG. 2), where: processing node 150(1) may be assigned and store three data blocks 205; processing nodes 150(2) and 150(3) may each be assigned and store two data blocks 205; and processing node 150(4) may be assigned and store one data block 205 (as viewed in FIG. 5). File 200 is received in response to processing an operation or job (e.g., map/reduce job), where data blocks 205 are assigned to a common group 305 as described above. The data blocks in the group are examined, and the partition boundaries are shifted in the file to partition the file (or document) into a plurality of data blocks each comprising one or more complete logical units of the document. For example, when the file is partitioned between the BPG and EPG fields of a page in the document, the BPG field portion resides in a first corresponding data block and the remaining portion, including the EPG field, resides in a subsequent data block. Once a data block is examined and determined to be partitioned within the page, the subsequent data block is retrieved to locate the first EPG field (corresponding to the BPG field of the processed data block). The located EPG field and all prior data in the subsequent data block are extracted and appended to the end of the data block being processed. This enables a full text extraction to occur on the subsequent data block. The partition boundary is effectively shifted to create a modified data block 500. The modified data block is written in the format of file 200 to produce a new stand-alone document (or sub-document) 505(1). Each of the data blocks 205 of common group 305 is processed in substantially the same manner, and new stand-alone documents (or sub-documents) 505(1)-505(8) are produced. The stand-alone documents are created from the partitions or splits, where each stand-alone document (or partition) is assigned (e.g., by the map/reduce framework) to a corresponding parallel task (e.g., map task) 510(1)-510(8) for parallel processing of the document.

There is a tradeoff between an amount of time to create stand-alone documents from each data block and the amount of time to process the file as one entity. Some document data types (e.g., non-sequential, etc.) may require additional or complex processing for partitioning of a document into stand-alone documents (or sub-documents). Accordingly, these types of documents may not attain the benefit from creation and processing of stand-alone documents (of the same type). For example, Portable Document Format (PDF) and other document data types may require special processing including retrieval of the entire document content.

Figure 6:
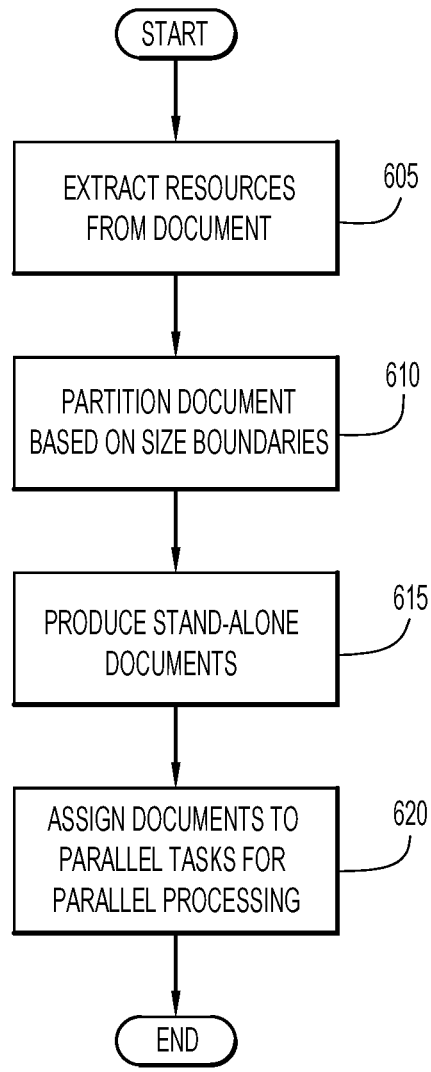
FIG. 6 is a procedural flow chart of a manner of partitioning a complex document for parallel processing according to an embodiment of the present invention.

However, it may still be beneficial to decompose or partition these types of documents (e.g., non-sequential, etc.) into smaller units (e.g., pages, etc.) of work to attain the advantages of parallel processing. A manner of processing these types of complex documents into stand-alone documents (e.g., via processing module 154, block module 156, and a processing node 150) according to an embodiment of the present invention is illustrated in FIG. 6. By way of example, the technique is described with reference to a PDF document. However, the technique may be employed for other documents in substantially the same manner described below.

Figure 7:
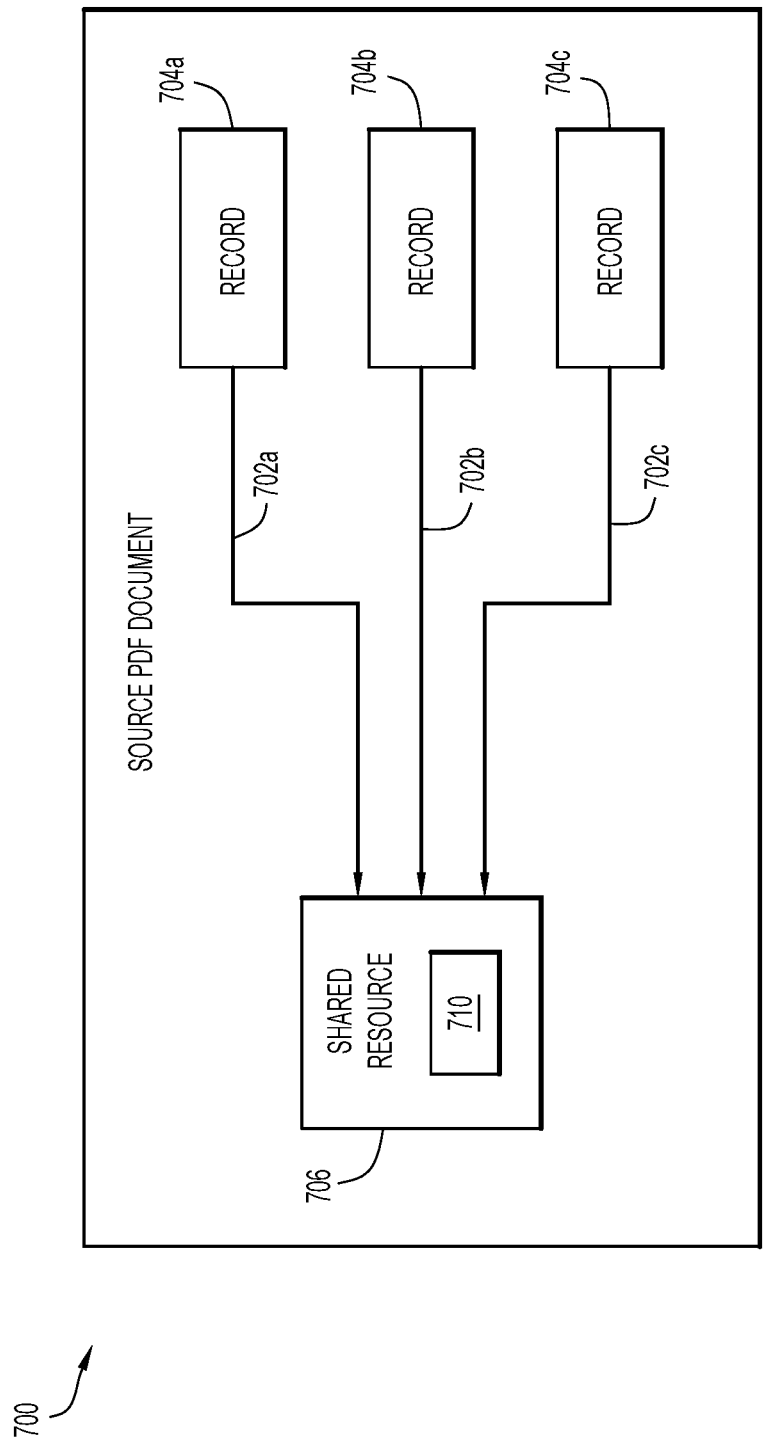
FIG. 7 is a block diagram of an example Portable Document Format (PDF) document.

In particular, resources of an example PDF document are initially extracted at step 605. For example, a PDF document or file contains an object table and references to shared objects (e.g., fonts, images, etc.) throughout the file. Referring to FIG. 7, an example PDF document 700 includes a collection of records. A record may be an individual document with a collection of data fields. The records may require individual access, and may share common characteristics or objects (e.g., images, fonts, logos at the same location of each page, etc.).

Shared resources may reduce the size of a PDF document. For example, a certain logo may appear in multiple locations in the document and be represented by a shared resource. A single image of the logo may be saved (instead of multiple images) for each location in which the logo appears. Locations within the PDF document that typically receive a copy of the image may include a pointer to the shared resource. Thus, the shared resource is referenced by one or more resource pointers associated with the records. By way of example, PDF document 700 includes a plurality of records 704*a*, 704*b*, and 704*c* and a shared resource 706. Each record 704*a*, 704*b*, and 704*c* includes a corresponding resource pointer 702*a*, 702*b*, and 702*c* to shared resource 706 that includes content 710.

Figure 8:
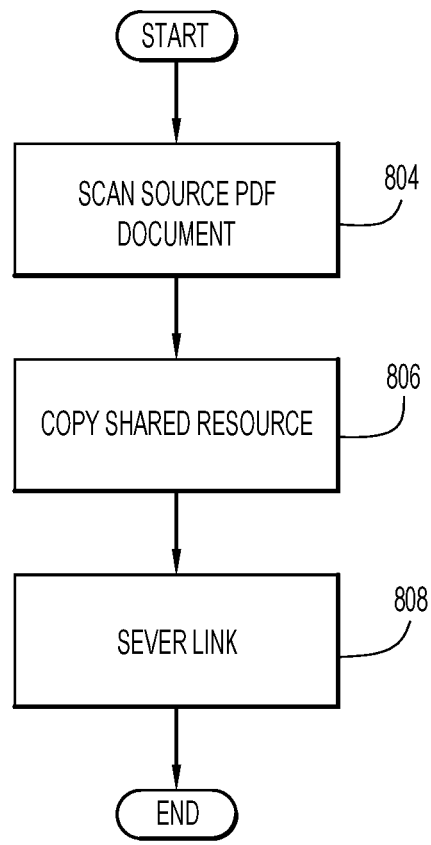
FIG. 8 is a procedural flow chart of a manner of extracting resources from the PDF document of FIG. 7.
Figure 9:
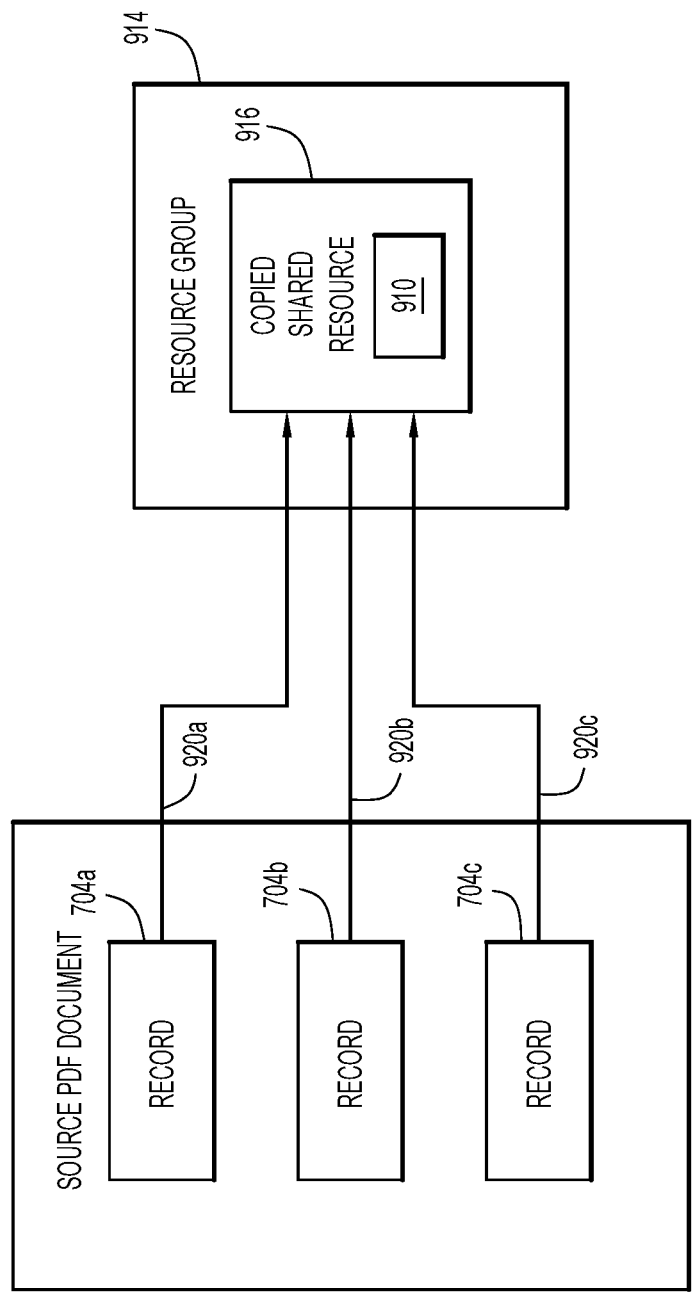
FIG. 9 is a block diagram of the PDF document of FIG. 7 with resources extracted in accordance with the manner of FIG. 8.

A manner of extracting resources from PDF document 700 (e.g., step 605 of FIG. 6) is illustrated in FIGS. 8 and 9. Initially, PDF document 700 is scanned for a shared resource 706 at step 804. The PDF document includes a plurality of records 704*a*, 704*b*, and 704*c* as described above. Shared resource 706 is a common resource initially referenced by resource pointers 702*a*, 702*b*, and 702*c* of corresponding records 704*a*, 704*b*, and 704*c*. Shared resource 706 is copied to a resource group 914 (FIG. 9) associated with the PDF document at step 806, and a link between content 710 for shared resource 706 and resource pointers 702*a*, 702*b*, and 702*c* of records 704*a*, 704*b*, and 704*c* is severed at step 808. The severance of the link may be accomplished by modifying or re-directing resource pointers 702*a*, 702*b*, and 702*c* to form reference pointers 920*a*, 920*b*, and 920*c* that point to copied shared resource 916 in resource group 914 (FIG. 9). Individual records 704*a*, 704*b*, and 704*c* may subsequently be extracted from the PDF document, where the extracted records lack content for the shared resource.

Referring back to FIG. 6, once the resources are extracted from the PDF document at step 605, the PDF document is subsequently partitioned on size (e.g., bit, byte, etc.) boundaries at step 610. The data blocks are processed to form stand-alone documents (or sub-documents) for parallel processing at step 615. This may be accomplished by processing the data blocks in substantially the same manner described above for FIG. 4 to shift the boundaries of the data blocks and form the stand-alone documents (or sub-documents). For example, a data block is compared to information within a schema (e.g., the resulting PDF document arrangement) for the PDF document to identify boundaries for the various logical units (e.g., pages, etc.) within the PDF document, and determine whether a partition has occurred within a logical unit. If the data block has not been partitioned on the desired logical boundary (e.g., has been partitioned within a logical unit), the remaining portion completing the logical unit may be extracted from a succeeding data block as described above (e.g., step 415). The extracted portion may be added to the end of the data block being processed (e.g., step 420) to complete the logical unit and enable the data block to be partitioned on a logical boundary (e.g., page, etc.) as described above. However, data may be retrieved from any quantity of other (succeeding or preceding) data blocks to complete logical units as described above.

Once the data block is processed and partitioned on a logical boundary, the data block is written in the format of the original source file (e.g., PDF) to produce a new stand-alone document (or sub-document) for assignment to parallel tasks (e.g., step 425) as described above. In the case of a PDF document, additional byte manipulation may be performed within the stand-alone document (e.g., according to PDF formatting) to ensure the stand-alone document is a valid PDF document. This may include rebuilding portions of the object table.

Once the data blocks have been processed, each data block is a stand-alone PDF document (or sub-document) and assigned (e.g., by the map/reduce framework) for processing by a separate parallel task (e.g., map task) at step 620.

Figure 10:
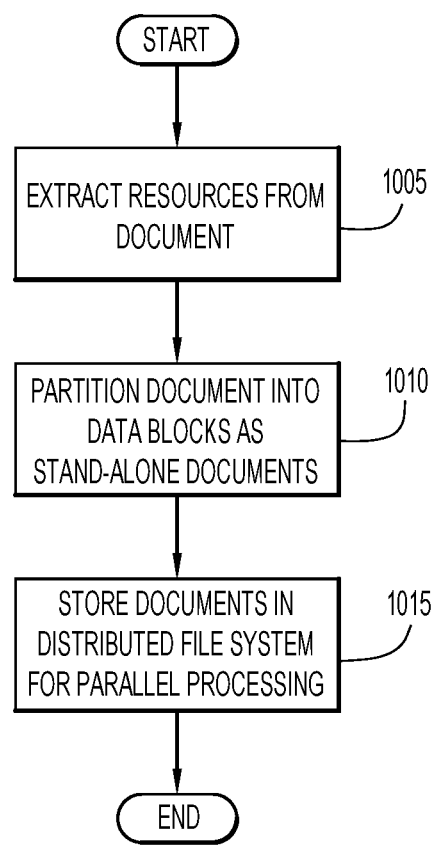
FIG. 10 is a procedural flow chart of an alternative manner of partitioning a complex document for parallel processing according to an embodiment of the present invention.

Alternatively, the PDF document may be initially partitioned in a manner facilitating parallel processing (e.g., via data storage module 154, block module 156, and a processing node 150) according to another embodiment of the present invention as illustrated in FIG. 10. This approach requires processing during storage to intelligently form the initial data blocks. Although this approach increases processing on ingestion of the data, processing is reduced for parallel processing of tasks.

In particular, resources are initially extracted from the PDF document at step 1005 in substantially the same manner described above (e.g., for FIGS. 7-9). The PDF document is subsequently partitioned to form the data blocks at step 1010. Each data block is a stand-alone document (or sub-document) suitable for parallel processing. This may be accomplished by initially partitioning the document (e.g., based on the approximate data block size for the distributed file system), and processing the partitions in substantially the same manner described above for FIG. 4 to shift the boundaries of the partitions and form data blocks with the stand-alone documents (or sub-documents). For example, a partition is compared to information within a schema (e.g., the resulting PDF document arrangement) for the PDF document to identify boundaries for the various logical units (e.g., pages, etc.) within the PDF document, and determine whether a partition has occurred within a logical unit. If the partition has not occurred on the desired logical boundary (e.g., resides within a logical unit), the remaining portion completing the logical unit may be extracted from a succeeding partition as described above (e.g., step 415). The extracted portion may be added to the end of the partition being processed (e.g., step 420) to complete the logical unit and form a data block partitioned on a logical boundary (e.g., page, etc.) as described above. However, data may be retrieved from any quantity of other (succeeding or preceding) partitions to complete logical units as described above. The data is shifted between partitions in a manner enabling each formed data block to be within a predetermined or threshold amount (e.g., a specific quantity, a percentage of the size of the data block, etc.) of a specified data block size.

Once the data block is formed on a logical boundary, the data block is written in the format of the original source file (e.g., PDF) to produce a new stand-alone document (or sub document) (e.g., step 425) as described above. In the case of a PDF document, additional byte manipulation may be performed within the stand-alone document (e.g., according to PDF formatting) to ensure the stand-alone document is a valid PDF document. This may include rebuilding portions of the object table.

Once the data blocks have been formed (e.g., where each data block is a stand-alone PDF document), the data blocks are stored in the distributed file system among processing nodes 150 at step 1015. When an operation or job (e.g., map/reduce job) is received for the PDF document, the data blocks are retrieved from the distributed file system. Since the data blocks are already in the form of stand-alone documents, they can be assigned to the processing nodes for parallel processing according to the distributed computing (e.g., map/reduce) framework. If the PDF document is retrieved for viewing, the document is re-assembled from the data blocks (as opposed to concatenation).

Present invention embodiments may be employed for documents of various data types, including those (e.g., with structured components, etc.) that are not able to be partitioned on size (e.g., bit, byte, etc.) boundaries (e.g., PDF, MS WORD, LINE, AFP, etc.). Parallel processing of these types of documents (e.g., documents that are not able to be partitioned on size boundaries) becomes extremely difficult, if not impossible, Accordingly, present invention embodiments enable these types of documents to be intelligently partitioned in a manner to take advantage of parallel processing and enhance computing performance.

It will be appreciated that the embodiments described above and illustrated in the drawings represent only a few of the many ways of implementing embodiments for performing distributed computing on document formats.

The environment of the present invention embodiments may include any number of computer or other processing systems (e.g., client or end-user systems, server systems, nodes, etc.) and file systems or other repositories arranged in any desired fashion, where the present invention embodiments may be applied to any desired type of computing environment (e.g., cloud computing, client-server, network computing, mainframe, etc.). The computer or other processing systems employed by the present invention embodiments may be implemented by any number of any personal or other type of computer or processing system (e.g., desktop, laptop, PDA, mobile devices, servers, etc.), and may include any commercially available operating system and any combination of commercially available and custom software (e.g., browser software, communications software, server software, client applications, data control modules, processing control modules, data storage modules, processing modules, block module, etc.). These systems may include any types of monitors and input devices (e.g., keyboard, mouse, voice recognition, etc.) to enter and/or view information.

It is to be understood that the software (e.g., data control modules, processing control modules, data storage modules, processing modules, block module, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., data control modules, processing control modules, data storage modules, processing modules, block module, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores, file systems, or storage units (e.g., files, databases, data structures, data or other repositories, distributed or other file systems, etc.) to store information (e.g., files, documents, data blocks, intermediate results, etc.). The storage units may be implemented by any number of any conventional or other databases, data stores or storage structures (e.g., files, databases, data structures, data or other repositories, etc.) to store information (e.g., documents, data blocks, intermediate results, etc.). The storage units may be included within or coupled to the server and/or client systems. The storage units may be remote from or local to the computer or other processing systems, and may store any desired data.

The present invention embodiments may employ any number of any type of user interface (e.g., Graphical User Interface (GUI), command-line, prompt, etc.) for obtaining or providing information (e.g., desired processing requests, documents, analysis, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The report may include any information arranged in any fashion, and may be configurable based on rules or other criteria to provide desired information to a user (e.g., results of the processing requests, analytics, text searching, etc.).

The present invention embodiments are not limited to the specific tasks or algorithms described above, but may be utilized for partitioning any types of files or documents in a manner enabling distributed or parallel processing on any type of distributed computing framework (e.g. map/reduce, etc.). The data blocks may be of any quantity, and contain any desired amount of any types of data. The documents may be of any desired format (e.g., text based, record based, structured or including structured components, compatible or incompatible with specific size partition boundaries, PDF, MS WORD, AFP, LINE, HTML, XML, etc.). The technique of present invention embodiments may be applied to partition any quantity of files or documents for parallel processing.

The partitioning may be based on any desired logical boundary (including any quantity of logical units) (e.g., page, line, paragraph, structured component, plural ones of these items, etc.). Any amount of data may be shifted between data blocks (or partitions) in any manner to either prior or succeeding data blocks (or partitions) to complete a logical boundary (e.g., data from a succeeding data block (or partition) may be appended to a prior data block (or partition) to complete a logical boundary, data from a prior data block (or partition) may be inserted into a succeeding data block (or partition) to complete a logical boundary, etc.). Moreover, any quantity of data may be retrieved from any quantity of other (succeeding or preceding) data blocks (or partitions) to complete a logical boundary.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products, according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   partitioning a document into a plurality of data blocks of equal number of bits and storing the plurality of data blocks across a plurality of processing elements of a distributed file system;
   in response to determining that one or more data blocks are not partitioned on a boundary of complete logical units of the document, adjusting the one or more data blocks of the plurality of data blocks to comprise one or more complete logical units of the document, wherein at least one data block of the one or more data blocks is adjusted by removing data from an adjacent data block that is stored on a different processing element from the processing element of the at least one data block, transferring, via a network, the data from the different processing element of the adjacent data block to the processing element of the at least one data block, and inserting the data into the at least one data block to result in the at least one data block including one or more complete logical units;
   producing a plurality of sub-documents from the plurality of data blocks including the one or more adjusted data blocks, wherein each sub-document is a stand-alone document that is formatted in a format of the document; and
   processing the plurality of sub-documents in parallel by a plurality of processing elements.

2. The method of claim 1, wherein the document includes a format unable to be partitioned based on a size boundary.

3. The method of claim 1, wherein the one or more complete logical units are defined according to page boundaries.

4. The method of claim 1, wherein the plurality of processing elements include map/reduce jobs of a map/reduce platform.

5. The method of claim 1, wherein the document includes a non-sequential data type.

6. The method of claim 1, further comprising:
   extracting resource information for one or more shared resources from the document, wherein extracting resource information for the one or more shared resources comprises severing each link between the one or more shared resources and one or more resource pointers in the document.

7. The method of claim 1, wherein boundaries of complete logical units are indicated by a schema corresponding to the format of the document.

* * * * *